July 9, 1929.    B. M. ARRICK    1,719,957
SPECTACLE TEMPLATE
Filed April 28, 1926
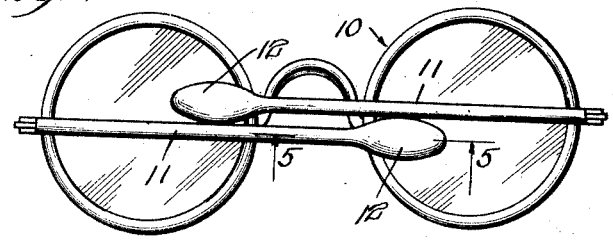
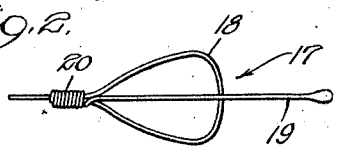
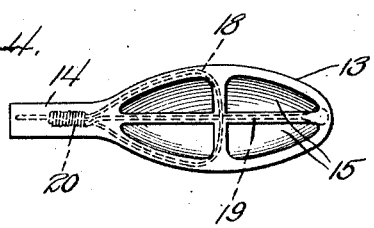
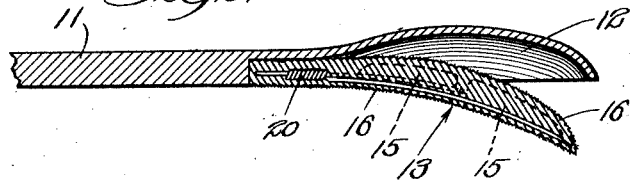
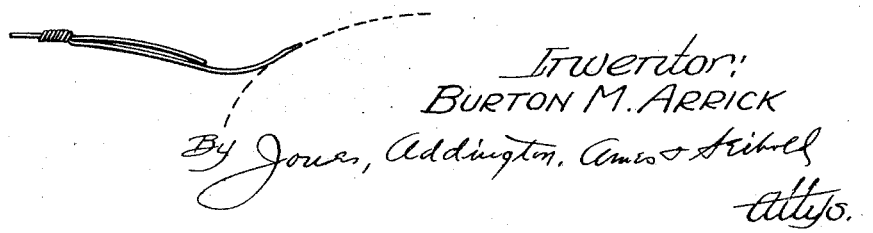
Inventor:
BURTON M. ARRICK
By Jones, Addington, Ames & Seibold
Attys.

Patented July 9, 1929.

1,719,957

UNITED STATES PATENT OFFICE.

BURTON M. ARRICK, OF CHICAGO, ILLINOIS.

SPECTACLE TEMPLATE.

Application filed April 28, 1926. Serial No. 105,082.

This invention relates to spectacle templates for eye glasses and relates particularly to spectacle templates which include suction cups whereby a double suction is created against the head near the temples when the device is in position on the face.

While it is old in the art to provide spectacles with suction cups for engagement with the temples or sides of the head in order to reduce the possibility of the glasses being dislodged from their position on the nose of the wearer, the inconveniences experienced, under various conditions, by the individual wearing spectacles equipped with the said suction cups has, however, led to applicant's novel method of improved construction of the vacuum cups and in their novel manner of operation, as hereinafter described and claimed.

The present invention comprises a holding means or template extending from the spectacles and having a cup-shaped device, preferably integral therewith, in which is secured a rubber pad containing a suction cup on the face side thereof and covered with a fabric. When in proper position on the side of the head, the rubber pad is pressed into the cup-shaped end of the template, thereby creating a double suction, one between the pad and the cup, and the other between the impressions on the face side of the pad and the side of the head.

The rubber pad has incased therein a spring member arranged in such a manner as to tend to separate the pad and the cup. A further function of the spring member is to provide a double spring action by means of an elongated portion backed up by a shorter portion and in which the initial action of the spring member prepares the suction cup for gripping, and an additional action of the spring member applies the holding power. It will be noted that the placing of the eye glasses in position will produce these actions entirely independent of any supplemental action on the part of the wearer.

It has been hereinbefore stated that the rubber pad is provided with a fabric covering. Heretofore, in the use of a suction cup, the oil in the skin, or the perspiration on the surface of the temples, has caused the suction cup to slip from its position. In the present invention the fabric coating serves as an absorbent for such oil or perspiration and also provides a slightly roughened, gripping surface which, taken either singly or in combination, serves to hold the spectacles in a very firm and substantial manner, thereby affording added comfort and convenience for the wearer.

One of the objects of the invention is to provide a spectacle template which is pleasing in appearance and efficient in operation.

A further object of this invention is to provide a spectacle template in which a double suction is created, when in position, against the head near the temples.

A further object of this invention is to provide a spectacle template in which a double spring action is provided whereby the initial action of the spring member prepares the template for gripping and a further and final action applies the holding power.

A further object of this invention is to provide a spectacle template in which the template is provided with an absorbent for the oil in the skin thereby preventing any tendency to slip while in position on the face.

Other objects of this invention will be hereinafter described, and for a better understanding of the nature, scope, and characteristics of this invention, reference may be had to the accompanying drawings, in which:

Figure 1 is a face view of a pair of spectacles showing the templates in a folded position;

Fig. 2 is a face view of the double acting spring member;

Fig. 3 is a side elevational view of Fig. 2;

Fig. 4 is a face view of the rubber pad showing the spring member encased therein in dotted lines;

Fig. 5 is a sectional view of the template taken on the line 5—5 of Fig. 1; and

Fig. 6 is a diagrammatic view showing the initial action of the spring member.

Referring more particularly to the drawing, the spectacles 10 are shown provided with holding means or templates 11 extending therefrom and pivotally secured thereto in the usual manner. The ends of the templates are formed into cup-shaped devices 12 and, although it is preferable for the sake of appearance to have these members integral with the templates 11, separate cup-shaped members may be provided to be secured in some suitable manner to the templates in order to afford an adjustment as to the length of the bows and in order to make replacements if desired. A rubber pad 13 is inserted into the cup-shaped member 12 and has a projection 14 extending from the edge of the pad, said projection being embedded in the template in any suitable manner as by molding, riveting, soldering, or any other well known method in the art. It is to be understood that, although the pad 13 has been described as being of rubber, various other materials or compositions of material may be used effectively without departing from the spirit of this invention.

Impressions 15 are formed on the face side of the pad and provide suction cups for engaging the temples of the wearer. The pad is covered with a fabric 16, such for instance as silk, and is preferably molded in the rubber pad. The fabric 15 serves as an absorbent for perspiration and as a roughened surface, both of which help to prevent any tendency of the spectacles to slip off. It is apparent that the ordinary use of a suction cup with a smooth rubber surface is very unsatisfactory due to the oily properties of the skin, and it is also obvious that the aforementioned improved suction cup neutralizes the objectionable effects of said oily properties of the skin, and allows said improved suction cup to grip in a firm and substantial manner.

A spring member 17 is preferably molded in the rubber pad 13 and comprises a single length of spring wire which is formed into a single convolution 18, whereafter one end 19 is wrapped around the second end, as at 20, and is extended a substantial distance beyond the convolution 18. The spring member 17 is positioned in the pad 13 so as to tend to separate the pad and the cup 12. Also, the elongated portion 19 is given a greater bend than the shorter portion 18, and the two portions thereby assume a spaced-apart relation providing a double spring action.

Upon placing the spectacles in position on the face of the wearer, the free end of the rubber pad engages the temple and the initial action of the spring is exerted which prepares the suction cup for gripping, as shown diagrammatically in Fig. 6. This initial action may be best explained by comparison with an ordinary vacuum cup wherein the air is manually expelled prior to such use as that for which it is appropriated. In the present invention, the air is expelled with the initial movement of the elongated portion until such a position is established that the shorter and, by nature of its characteristics, the stiffer portion, is caused to actuate, and a further and final movement of the spectacles in placing them in position applies the holding power.

It will be noted that several forces co-act to cause the templates to grip, namely, the action of the spring member 17, the suction created between the impressions 15 in the face side of the pad and that of the temples, the suction created between the pad 13 and the cup-shaped member 12, and that pressure within the body of the wearer which pressure tends to fill the impressions of the pad or the slightly roughened surface of the pad.

While it is preferable to embody this invention in the device herein shown and described, various other forms will be apparent to one skilled in the art, and therefore, this invention is to be limited only by the scope of the appended claims and the prior art.

I claim:

1. A spectacle template comprising a cup-shaped member, a pad secured to said cup-shaped member for providing a suction therebetween when in an operable position, said pad having impressions in the face side thereof for providing a suction between said pad and the side of the head.

2. A spectacle template comprising a cup-shaped member, a resilient pad secured to said cup-shaped member for providing a suction therebetween when in an operable position, said pad having impressions in the face side thereof for providing a suction between said pad and the side of the head.

3. A spectacle template comprising a resilient pad, a spring member mounted in said pad, said pad having impressions on one side thereof for providing a suction between said pad and the side of the head.

4. A spectacle template comprising a resilient pad, said pad having an absorbent covering and impressions on one side thereof for providing a suction between said pad and the side of the head.

5. A spectacle template comprising a resilient pad, said pad having impressions on one side thereof for providing a suction between said pad and the side of the head, and a spring member mounted in said pad and having an elongated portion backed up by a shorter portion whereby the initial action of said spring member prepares the pad for gripping and a further action applies the holding power.

6. A spectacle template comprising a cup-shaped member, a resilient pad secured to said cup-shaped member for providing a suction therebetween when in an operable position, a fabric covering on said pad for absorbing the oil in the skin, said pad having impressions in the face side thereof for providing a suction between said pad and the side of the head.

7. A spectacle template comprising a cup-shaped member, a resilient pad secured to said cup-shaped member for providing a suction therebetween when in an operable position, said pad having impressions on one side thereof for providing a suction between said pad and the side of the head, and a spring member mounted in said pad comprising a single length of spring wire formed into an elongated portion backed up by a shorter portion whereby the initial action of said spring member prepares the pad for gripping and a further action applies the holding power.

8. A spectacle template including a spring member comprising a single length of spring wire formed into a loop having an elongated end portion projecting therebeyond to be influenced by said loop.

9. A spectacle template including a spring member comprising a loop portion having an elongated portion extending therebeyond to be influenced by said loop portion.

10. A spectacle template comprising a spring member and a covering therefor, said spring member comprising a loop portion having an elongated portion extending therebeyond to be influenced by said loop portion.

In witness whereof, I have hereunto subscribed my name.

BURTON M. ARRICK.